UNITED STATES PATENT OFFICE.

OSCAR O. B. FROELICH, OF JERSEY CITY, NEW JERSEY.

PROCESS OF MAKING ANTIMONY FLUORIDES.

SPECIFICATION forming part of Letters Patent No. 431,044, dated July 1, 1890.

Application filed October 31, 1889. Serial No. 328,828. (No specimens.)

*To all whom it may concern:*

Be it known that I, OSCAR O. B. FROELICH, a resident of Jersey City, Hudson county, and State of New Jersey, have invented an Improved Process of Making Fluoride of Antimony and its Compounds with Fluorides and Sulphates of Alkalies or of Ammonia, of which the following is a specification.

At present the soluble and crystallized compounds of fluoride of antimony, used as mordants for dyeing purposes, are manufactured by dissolving trioxide of antimony in hydrofluoric acid, to which solution other salts—such as fluorides or sulphates of alkalies or of ammonia—are added. The following new process starts and effects the formation of these double salts direct from the raw materials, antimony ore (trisulphide of antimony) and fluor-spar, (fluor-calcium,) and is therefore far more economical than previous processes.

I proceed as follows: A mixture of antimony ore, nitrate of soda, (or its equivalent, nitrate of potash, or ammonia) and fluor-spar, in the proportions given below and each finely powdered, is gradually added to warm oil or vitriol diluted with water to about 50° Baumé. A vehement reaction, accompanied by great heat and the expulsion of volumes of nitrous-acid gases, at once takes place, leaving a grayish pasty product, which is again heated and stirred until the reaction is completed. Water is then added, and also steam passed through the mixture, until the soluble ingredients are dissolved. The insoluble residue mainly consists of sulphate of lime, sulphur, and impurities of the ore and the fluor-spar, while the solution contains fluoride of antimony, and, according to the proportions of oil of vitriol and fluor-spar used, either acid sulphate or fluoride of the alkali or of ammonia applied. After neutralizing the surplus of acid with carbonates of alkalies (or their equivalents, caustic alkalies or ammonia) the liquor is evaporated to crystallization.

The chemical process takes place according to the following formulas:

First. $Sb_2S_3 + 2NO_3Na + 3CaFl_2 + 5SO_4H_2 = 2SbFl_3 + 2SO_4HNa + 3SO_4Ca + 3S + N_2O_2 + 4OH_2$.

The above formula shows the result of the addition of vitriol.

Second. $2SbFl_3 + 2SO_4HNa + NaOH$ (the soluble matter plus the neutralizer) $= 2(SbFl_3 SO_4Na_2) + OH_2$ (when neutralized.)

Third, or instead of formula "First." $Sb_2S_3 + 2NO_3Na + 5CaFl_2 + 5SO_4H_2 = 2SbFl_3 + 2NaFl + 2HFl + 5SO_4Ca + 3S + N_2O_2 + 4OH_2$.

Fourth, which results instead of formula Second, as follows: $2SbFl_3 + 2NaFl + 2HFl + 2NaOH = 2(SbFl_3 2NaFl) + OH_2$.

These formulas show that to obtain a combination of fluoride of antimony with sulphates three molecules of fluor-spar to five molecules of oil of vitriol are used, while in order to get double fluorides at least five molecules of fluor-spar to five molecules of oil of vitriol have to be applied. The proportion of nitrate to antimony ore (two molecules to one) remains unchanged.

The resulting products are well-formed crystals.

Having now described my invention, what I claim is—

1. The process of making fluoride of antimony and its soluble compounds, which process consists in treating a mixture of antimony ore, alkaline nitrates, and fluor-spar with oil of vitriol, substantially as described.

2. The process of making fluoride of antimony and its soluble compounds, which process consists in first treating a mixture of antimony ore, alkaline nitrates, and fluor-spar with oil of vitriol, and in then extracting the soluble matter with water, substantially as described.

3. The process of making fluoride of antimony and its soluble compounds, which process consists in first treating a mixture of antimony ore, alkaline nitrates, and fluor-spar with oil of vitriol, in then extracting the soluble matter with water, and in then neutralizing the solution with alkalies, substantially as described.

4. The process of making fluoride of antimony and its soluble compounds, which process consists in first treating a mixture of antimony ore, alkaline nitrates, and fluor-spar with oil of vitriol, in then extracting the soluble matter with water, in then neutralizing the solution with alkalies, and finally evaporating to crystallization, substantially as described.

OSCAR O. B. FROELICH.

Witnesses:
THORNLEY DICKSON,
JOHN M. SPEER.